(12) United States Patent
Rockstroh

(10) Patent No.: US 6,900,409 B2
(45) Date of Patent: May 31, 2005

(54) SINGLE HEAD LASER HIGH THROUGHPUT LASER SHOCK PEENING

(75) Inventor: Todd Jay Rockstroh, Maineville, OH (US)

(73) Assignee: General Electric Company, Schenectady, NY (US)

(*) Notice: Subject to any disclaimer, the term of this patent is extended or adjusted under 35 U.S.C. 154(b) by 104 days.

(21) Appl. No.: 10/646,302

(22) Filed: Aug. 22, 2003

(65) Prior Publication Data
US 2005/0040149 A1 Feb. 24, 2005

(51) Int. Cl.⁷ .............................................. B23K 26/00
(52) U.S. Cl. ................................................ 219/121.6
(58) Field of Search ........................ 219/121.6, 121.61, 219/121.73, 121.83, 121.62; 372/108, 10, 25, 12; 148/565, 714, 903

(56) References Cited

U.S. PATENT DOCUMENTS

| | | | |
|---|---|---|---|
| 3,675,022 A | * | 7/1972 | Nelson et al. .............. 398/184 |
| 3,777,208 A | * | 12/1973 | Ryason .................. 313/231.71 |
| 3,850,698 A | | 11/1974 | Mallozzi et al. |
| 3,941,453 A | * | 3/1976 | Kruger ....................... 359/253 |
| 4,053,763 A | * | 10/1977 | Harney ...................... 250/206 |
| 4,401,477 A | | 8/1983 | Clauer et al. |
| 4,937,421 A | | 6/1990 | Ortiz, Jr. et al. |
| 5,127,019 A | | 6/1992 | Epstein et al. |
| 5,131,957 A | | 7/1992 | Epstein et al. |
| 5,325,456 A | | 6/1994 | Cullen et al. |
| 5,492,447 A | | 2/1996 | Mannava et al. |
| 5,531,570 A | | 7/1996 | Mannava et al. |
| 5,591,009 A | | 1/1997 | Mannava et al. |
| 5,674,328 A | | 10/1997 | Mannava et al. |
| 5,674,329 A | | 10/1997 | Mannava et al. |
| 5,730,811 A | | 3/1998 | Azad et al. |
| 5,756,965 A | | 5/1998 | Mannava |
| 5,932,120 A | | 8/1999 | Mannava et al. |
| 5,987,042 A | | 11/1999 | Staver et al. |
| 6,002,706 A | * | 12/1999 | Staver et al. .............. 372/108 |
| 6,016,324 A | | 1/2000 | Rieger et al. |
| 6,021,154 A | | 2/2000 | Unternahrer |
| 6,108,357 A | | 8/2000 | Unternahrer |
| 6,198,069 B1 | | 3/2001 | Hackel et al. |
| 6,215,099 B1 | | 4/2001 | Livshits |
| 6,373,876 B1 | | 4/2002 | Dulaney et al. |
| 6,385,228 B1 | | 5/2002 | Dane et al. |
| 6,426,838 B1 | | 7/2002 | Rudeen |
| 6,541,733 B1 | | 4/2003 | Mannava et al. |
| 6,587,483 B2 | | 7/2003 | Kittelmann et al. |
| 6,829,257 B2 | * | 12/2004 | Comaskey .................. 372/12 |

OTHER PUBLICATIONS

Patent Act 1977: Search Report under Section 17(5), Sep. 21, 2004, 3 pages.

(Continued)

Primary Examiner—Jonathan Johnson
(74) Attorney, Agent, or Firm—William Scott Andes; Steven J. Rosen

(57) ABSTRACT

A laser unit in a laser shock peening apparatus for generating a primary laser beam along a primary beam path includes a pulsed free running oscillator with only a single lasing rod. An electro-optic switch external to the free running laser oscillator is operably disposed along the primary beam path to block the initial slow rise time of the primary laser beam from the free running oscillator and reject energy away from the primary beam path. At least one optical transmission circuit is used to form at one stationary laser beam from the primary laser beam and direct the stationary laser beam towards at least one laser shock peening target area. A delay generator controllably connected to the electro-optic switch is used to reject energy away from the primary beam path along a dump path to a dump and sharpen pulses of the primary laser beam.

31 Claims, 2 Drawing Sheets

OTHER PUBLICATIONS

"Component Database", High Energy Laser Optics: Global Component Database, 2 pages, Jun. 26, 2003, http://www.medibix.com.

"Plate Polarizers", Melles Griot, pp. 14.18 & 14.19, http://www.mellesgriot.com, no date avail.

"Application Notes for Faraday Rotators and Isolators", The Faraday or Magneto–Optic Effect, 3 pages, Jun. 23, 2003, http://www.lasercomponentsusa.com.

"Polarizers / optical components", Glan–Taylor Calcite Air Spaced Polarizer, 9 pages, Jun. 26, 2003, http://www.laser-componentsusa.com.

"Fiber Optic Isolators", Photonics, Newport, pp. 270–272, Jun. 23, 2003, http://www.newport.com.

"Faraday Rotators and Isolators", EOT, Electro–Optics Technology, Inc., 6 pages, Jun. 23, 2003, http://www.luminex.co.jp/Catalog/FaradayIsolator.htm.

"PBSK—High Energy Broadband Polarizing Beamsplitter Cube", CVI Laser Corporation, 5 pages, 1–800–296–9541, no date avail.

"GSI Lumonics Introduces Updated JK700TR Series of Pulsed Processing Systems", News Release, 3 pages, Aug. 12, 2003, http://www.gsilumonics.de/process_product_news/ppr_laser_sources/jk700tr_pr.htm.

"We Think Laser", ROFIN—the innovative leader in the industrial laser market, 2 pages, Aug. 12, 2003, http://www.rofin.com/english/unternehmen/index.htm.

"Lasers and laser systems", ROFIN—lasers and laser systems for cutting, welding and surface treatment, 2 pages, Aug. 12, 2003, http://www.rofin.com/english/laser/index.htm.

"Welcome at Trumpf Laser", Trumpf Laser GmbH + Co., solid–state laser, laser material processing, laser, 1 page, Aug. 12, 2003, http://www.trumpf–laser.com/147.start.html.

"LASAG Products", Products, 1 page, Aug. 12, 2003, http://www.lasag.com/lasag_e/products/products.html.

"JK401 Industrial Solid State Nd:YAG Laser Processing System", Products, GSI Lumonics, 1 page, Aug. 12, 2003, http://www.gsilumonics.com/product_data_sheets/199.html.

* cited by examiner

SINGLE HEAD LASER HIGH THROUGHPUT LASER SHOCK PEENING

BACKGROUND OF THE INVENTION

1. Field of the Invention

This invention relates to laser shock peening and, more particularly, to apparatus and methods for laser shock peening laser with a single head laser.

2. Description of Related Art

Laser shock peening (LSP) or laser shock processing, as it is also referred to, is a process for producing a region of deep compressive residual stresses imparted by laser shock peening a surface area of an article. Laser shock peening typically uses one or more radiation pulses from high and low power pulsed lasers to produce an intense shock wave at the surface of an article similar to methods disclosed in U.S. Pat. No. 3,850,698 entitled "Altering Material Properties"; U.S. Pat. No. 4,401,477 entitled "Laser Shock Processing"; and U.S. Pat. No. 5,131,957 entitled "Material Properties". Laser shock peening, as understood in the art and as used herein, means utilizing a pulsed laser beam from a laser beam source to produce a strong localized compressive force on a portion of a surface by producing an explosive force at the impingement point of the laser beam by an instantaneous ablation or vaporization of a thin layer of that surface or of a coating (such as tape or paint) on that surface which forms a plasma.

Laser shock peening is being developed for many applications in the gas turbine engine field, some of which are disclosed in the following U.S. Pat. No. 5,756,965 entitled "On The Fly Laser Shock Peening"; U.S. Pat. No. 5,591,009 entitled "Laser shock peened gas turbine engine fan blade edges"; U.S. Pat. No. 5,531,570 entitled "Distortion control for laser shock peened gas turbine engine compressor blade edges"; U.S. Pat. No. 5,492,447 entitled "Laser shock peened rotor components for turbomachinery"; U.S. Pat. No. 5,674,329 entitled "Adhesive tape covered laser shock peening"; and U.S. Pat. No. 5,674,328 entitled "Dry tape covered laser shock peening", all of which are assigned to the present Assignee.

High energy laser beams, from about 20 to about 50 Joules, or low energy laser beams, from about 3 to about 10 Joules, have been used and other levels are contemplated. See, for example, U.S. Pat. No. 5,674,329 (Mannava et al.), issued Oct. 7, 1997 (LSP process using high energy lasers) and U.S. Pat. No. 5,932,120 (Mannava et al.), issued Aug. 3, 1999 (LSP process using low energy lasers). Low energy laser beams can be produced using different laser materials such as neodymium doped yttrium aluminum garnet (Nd YAG), Nd:YLF, and others. Low energy laser shock peening was developed in an effort to reduce the cost of the laser apparatus, reduced maintenance expenses, and reduce the cost of the laser shock peening process. However, these laser machines are still more complex and expensive as compared to conventional laser drilling machines. Laser drilling machines typically have a single laser.

It is known that large laser pulses, on the order of 20 to 50 Joules (J) per pulse with a leading edge temporal rise time of 5 to 15 nanoseconds and a full width half maximum pulse duration of 20 to 50 nanoseconds can be generated. To create these large laser pulses, the laser generator becomes complex and physically large, incorporating six to over a dozen glass laser rods or heads in order to deliver the energy required for LSP. These lasers are limited to generating a pulse every few seconds to around 2 pulses per second. Lower energy lasers that deliver pulse energies on the order of 5 to 10 Joules enable alternative laser technologies such as Nd:YAG rod crystals to be used. These can deliver the same temporal characteristics at lower energies but at a faster pulsing rate of around 10 Hertz.

In either case, glass at 50 Joules or YAG at 5 Joules, the number of laser heads or rods required to generate the noted energies makes these systems complex, expensive, expensive to maintain and have lower availability for LSP production. Thus, it is highly desirable to have a laser shock peening apparatus and method that incorporates a single head laser for laser shock peening (LSP).

SUMMARY OF THE INVENTION

A laser unit in a laser shock peening apparatus for generating a primary laser beam along a primary beam path includes a pulsed free running oscillator with only a single lasing rod. An electro-optic switch, such as a Pockels cell, external to the free running laser oscillator is operably disposed along the primary beam path to block the initial slow rise time of the primary laser beam from the free running oscillator and sharpen pulses of the primary laser beam from the lasing rod.

In the exemplary embodiment of the laser unit, the electro-optic switch rejects energy away from the primary beam path along a dump path to a dump. At least one optical transmission circuit is used to form at least one stationary laser beam from the primary laser beam and direct the stationary laser beam towards at least one laser shock peening target area. A delay generator controllably connected to the electro-optic switch may be used to trigger the electro-optic switch. A fast photodiode operably connected to the delay generator may be used for measuring an initial laser output pulse from the laser oscillator and triggering the delay generator to switch the Pockels cell. In a more particular exemplary embodiment of the laser unit, the power supply, the flash lamps, the lasing rod are set to fire laser output pulses from the lasing rod having an energy of greater than 1 J, a rise time of about several hundred microseconds, and a pulse duration in a range of about a few hundred microseconds to 1 millisecond. The Pockels cell is set to sharpen the primary laser beam so that it has at least 1 Joule of energy.

In the exemplary embodiment of the laser shock peening apparatus, a beam splitter is operably located after the electro-optic switch along the primary beam path for splitting the primary laser beam along two optical transmission circuits, which include the one optical transmission circuit. The two optical transmission circuits are operable for forming two stationary laser beams which include the one stationary laser beam. The two optical transmission circuits direct the stationary laser beams towards two laser shock peening target areas which include the one laser shock peening target area.

DETAILED DESCRIPTION OF THE INVENTION

Figure 1:
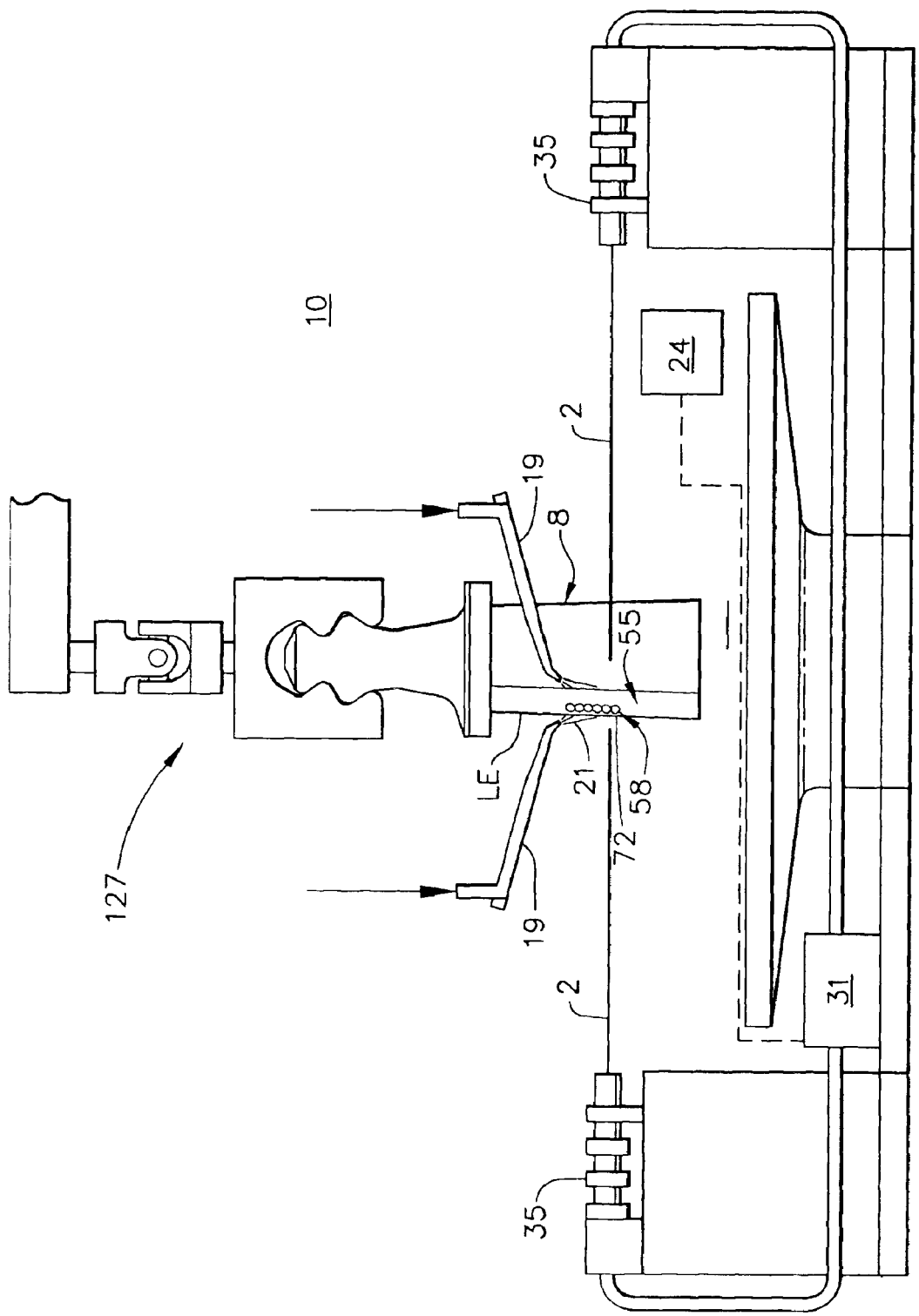
FIG. 1 is a schematical illustration of a laser shock peening system with a single rod laser.

Illustrated in FIG. 1 is a shock peening apparatus 10 for laser shock peening an article or workpiece illustrated by a gas turbine engine blade 8 mounted in a multi-axis computer numerically controlled (CNC) manipulator 127. Stationary laser beams 2 are directed towards target areas 42. The laser shock peening apparatus 10, illustrated in FIG. 1, includes a laser unit 31 having an oscillator 33. A controller 24 may be used to modulate and fire the laser beam apparatus to fire the laser beam 2 on coated laser shock peening surface 55 in a controlled manner and control the operation and movement of the manipulator 127.

Figure 2:
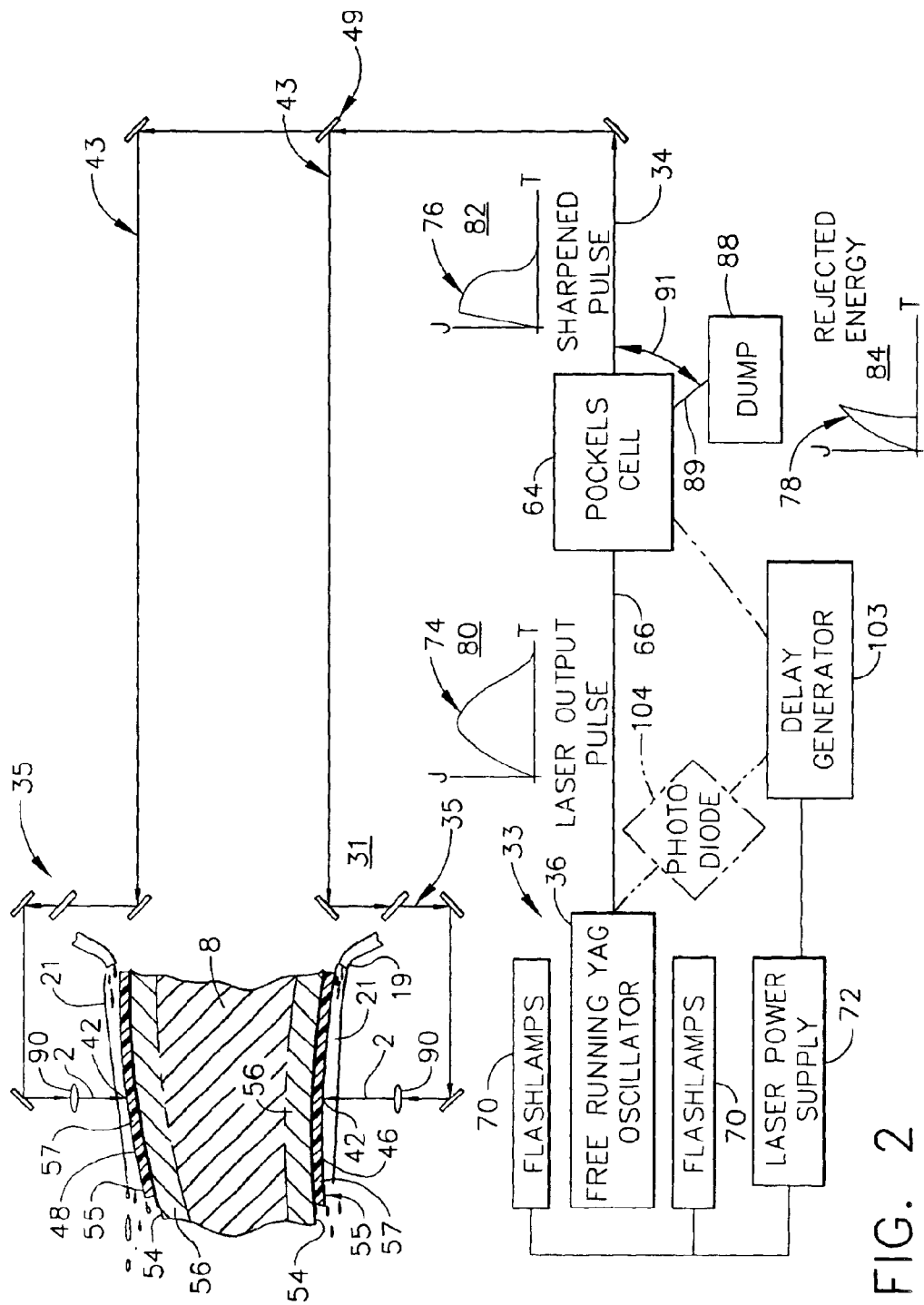
FIG. 2 is a schematical illustration of the laser and optics of the laser shock peening system illustrated in FIG. 1.

The laser unit 31 is more particularly illustrated in FIG. 2. The oscillator 33 in the laser unit 31 has only a single lasing rod 36. The exemplary oscillator 33 is a conventional pulsed YAG free running oscillator. An example of such an oscillator is a Convergent-Prima P50 as well as other YAG lasers primarily manufactured for drilling. These lasers generate between 1 and 50 Joules, at 1 to over 100 Hz, at pulse widths from a few hundred microseconds to over 1 millisecond. They are commercially available from several vendors such as Trumpf, Rofin Sinar, Lasag, and JK. The laser may be operated with the parameters combined in many ways with the average power (e.g. rep rate×energy/pulse) less than 500 Watts and typically less than 200 Watts. The leading edge rise time of a free running oscillator is on the order of several hundred microseconds which is too slow to create the blast and acoustic waves for laser shock peening.

An electro-optic switch or Pockels cell 64 external to the free running laser oscillator 33 is used to block the initial slow rise time of a primary laser beam 34 of the free running oscillator, rejecting the energy away from a primary beam path 66. At a predesignated time, the Pockels cell state is transformed to an "on" condition and the remainder of the output pulse travels through the Pockels cell and through the optics 35 where it is focused onto the laser shock peening surfaces 55 of the article being laser shock peened. Other lasing media may be used such as Nd:Ytrbium, the medium apparently not being critical other than being able to generate 1 to 50 Joules at a frequency of 10 Hz or higher (for speed in processing).

The free running YAG laser oscillator 33 is pumped by a pair of flash lamps 70 which actuate the lasing rod 36 and which are driven by a power supply 72 at a frequency of about 10 Hz or higher. A laser output pulse 74 from the lasing rod 36 of the free running YAG laser oscillator 33 has an energy of greater than 1 J, with a rise time of several hundred microseconds and a pulse duration of a few hundred microseconds to 1 millisecond as illustrated by a first energy rise graph 80 in FIG. 2, shown in Joules vs time (J vs T). The output pulse 74 is delivered to a Pockels cell 64 which is initially off. In the off condition, the Pockels cell 64 absorbs and/or rejects all of the energy from of the output pulse 74 from the free running YAG laser oscillator 33 along a dump path 89 which is not aligned with the primary beam path 66 into a dump 88. The primary beam path 66 is at an acute dump angle 91 to the dump path 89. Rejected energy 78 from the Pockels is represented graphically in Joules vs time in rejected energy graph 84.

After an initial one of the output pulses 74 is rejected into the dump 88, the Pockels cell 64 is turned on in a short period of time (typically less than 5 nanoseconds) and a sharpened pulse 76 is formed, as illustrated by a second energy rise graph 82 in FIG. 2., in the primary laser beam 34 which then travels down the primary beam path 66. At this point, the primary laser beam 34 has at least 1 Joule (less than 1 Joule being rejected off the front temporal end of the laser pulse) and is delivered through the beam optical transmission circuits 43 including focusing lenses 90 to the laser shock peening surfaces 55 where it impacts the surfaces creating a blast wave and acoustic compression wave for the laser shock peening process.

The timing of the Pockels cell 64 relative to the laser pulse firing is important. The free running oscillator may not be sufficiently accurate in repetition rate to trigger the Pockels cell 64 by pulsing of the power supply 72 and a delay generator 103 controllably connected to the Pockels cell 64 may be used to trigger the Pockels cell 64. A fast photodiode 104 may be used to accurately measure the initial laser pulse at the laser output and trigger the delay generator 103 to switch the Pockels cell 64 at a predetermined and repeatable delay to accurately create a fast laser shock peening pulse leading edge rise time.

A beam splitter 49 feeds the primary laser beam into two beam optical transmission circuits 43 used to form the stationary laser beams 2. Each of the beam optical transmission circuits 43 includes optics 35 to direct the stationary laser beams 2 towards target areas 42. The optics 35 include optical elements, including the lens 90, that transmit and focus the laser beam 2 on laser shock peening surfaces 55.

Laser shock peening surfaces 55, located in the target areas 42, are illustrated on pressure and suction sides 46 and 48, respectively, of a leading edge LE of the blade 8. The laser shock peening surfaces 55 are coated with an ablative coating 57 such as paint or adhesive tape to form coated surfaces as disclosed in U.S. Pat. Nos. 5,674,329 and 5,674,328. The coating 57 provides an ablative medium over which a clear containment medium is placed, such as a fluid curtain such as a curtain of flowing water 21. During laser shock peening, the blade 8 is moved while the stationary laser beams 2 are fired through curtains of flowing water 21, dispensed by water nozzles 19, on the laser shock peening surfaces 55. The laser shock peening process is typically used to form overlapping laser shock peened circular spots 58 on laser shock peened surfaces 54.

Laser beam shock induced deep compressive residual stresses are formed in compressive pre-stressed regions 56. The compressive residual stresses are generally about 50–150 KPSI (Kilo Pounds per Square Inch) and extend from the laser shock peened surfaces 54 to a depth of about 20–50 mils into the pre-stressed regions continuously. The laser beam shock induced deep compressive residual stresses are produced by repetitively firing the laser beams 2 which are typically defocused plus or minus a few hundred mils with respect to the laser shock peening surface 55.

The laser beams 2 rapidly ablate the coating 57 generating plasma which results in shock waves on the surface of the material. Other ablative materials may be used to coat the surface as suitable alternatives to paint. These coating materials include metallic foil or adhesive plastic tape as disclosed in U.S. Pat. Nos. 5,674,329 and 5,674,328. The articles material may also be ablated if no ablative coating 57 is used. These shock waves are redirected towards the coated surfaces by the curtain of flowing water 21 to generate travelling shock waves (pressure waves) in the material below the coated surfaces. The amplitude and quantity of these shockwaves determine the depth and intensity of compressive stresses. The ablative coating 57 is used to protect the target surface and also to generate plasma.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A laser shock peening apparatus comprising:
   a laser unit for generating a primary laser beam along a primary beam path,
   the laser unit including a pulsed free running oscillator with only a single lasing rod,
   an electro-optic switch external to the free running laser oscillator and operably disposed along the primary beam path of the primary laser beam to block the initial slow rise time of the primary laser beam from the free running oscillator and reject energy away from the primary beam path, and
   at least one optical transmission circuit for forming at one stationary laser beam from the primary laser beam and directing the one stationary laser beam towards at least one laser shock peening target area.

2. An apparatus as claimed in claim 1 further comprising a dump path from the electro-optic switch to a dump and along which the energy is rejected away from the primary beam path.

3. An apparatus as claimed in claim 2 further comprising a delay generator controllably connected to the electro-optic switch for triggering the electro-optic switch.

4. An apparatus as claimed in claim 1 wherein the electro-optic switch is a Pockels cell.

5. An apparatus as claimed in claim 4 further comprising a dump path from the electro-optic switch to a dump and along which the energy is rejected away from the primary beam path.

6. An apparatus as claimed in claim 5 further comprising a delay generator controllably connected to the Pockels cell for triggering the Pockels cell.

7. An apparatus as claimed in claim 6 further comprising a fast photodiode operably disposed in the laser unit for measuring an initial laser output pulse from the laser oscillator and operably connected to the delay generator for triggering the delay generator to switch the Pockels cell.

8. An apparatus as claimed in claim 7 further comprising a fluid nozzle directed towards the laser shock peening area.

9. An apparatus as claimed in claim 7 further comprising:
   a beam splitter operably located after the electro-optic switch along the primary beam path for splitting the primary laser beam along two optical transmission circuits which include the one optical transmission circuit,
   the two optical transmission circuits operable for forming two stationary laser beams which include the one stationary laser beam, and
   the two optical transmission circuits further operable for the directing the stationary laser beams towards two laser shock peening target areas which include the one laser shock peening target area.

10. An apparatus as claimed in claim 7 further comprising a fluid nozzle directed towards each of the laser shock peening areas.

11. An apparatus as claimed in claim 1 further comprising a fluid nozzle directed towards the laser shock peening area.

12. An apparatus as claimed in claim 11 further comprising a dump path from the electro-optic switch to a dump and along which the energy is rejected away from the primary beam path.

13. An apparatus as claimed in claim 11 wherein the electro-optic switch is a Pockels cell.

14. An apparatus as claimed in claim 13 further comprising a dump path from the Pockels cell to a dump and along which the energy is rejected away from the primary beam path.

15. An apparatus as claimed in claim 14 further comprising a delay generator controllably connected to the Pockels cell for triggering the Pockels cell.

16. An apparatus as claimed in claim 15 further comprising a delay generator controllably connected to the Pockels cell for triggering the Pockels cell.

17. An apparatus as claimed in claim 16 further comprising a fast photodiode operably disposed in the laser unit for measuring an initial laser output pulse from the laser oscillator and operably connected to the delay generator for triggering the delay generator to switch the Pockels cell.

18. An apparatus as claimed in claim 1 further comprising:
   at least one flash lamp operably disposed for actuating the lasing rod,
   a power supply drivably connected to the flash lamp, and
   the power supply set to power the flash lamp at a frequency of about 10 Hz or higher.

19. An apparatus as claimed in claim 1 further comprising:
   at least one pair of flash lamps operably disposed for actuating the lasing rod,
   a power supply drivably connected to the flash lamps, and
   the power supply set to power the flash lamp at a frequency of about 10 Hz or higher.

20. An apparatus as claimed in claim 19 wherein the electro-optic switch is a Pockels cell.

21. An apparatus as claimed in claim 20 further comprising a dump path from the electro-optic switch to a dump and along which the energy is rejected away from the primary beam path.

22. An apparatus as claimed in claim 21 further comprising a delay generator controllably connected to the Pockels cell for triggering the Pockels cell.

23. An apparatus as claimed in claim 22 further comprising a fast photodiode operably disposed in the laser unit for measuring an initial laser output pulse from the laser oscillator and operably connected to the delay generator for triggering the delay generator to switch the Pockels cell.

24. An apparatus as claimed in claim 23 further comprising:
   a beam splitter operably located after the electro-optic switch along the primary beam path for splitting the primary laser beam along two optical transmission circuits which include the one optical transmission circuit,
   the two optical transmission circuits operable for forming two stationary laser beams which include the one stationary laser beam, and
   the two optical transmission circuits further operable for the directing the stationary laser beams towards two laser shock peening target areas which include the one laser shock peening target area.

25. An apparatus as claimed in claim 24 further comprising a fluid nozzle directed towards each of the laser shock peening areas.

26. An apparatus as claimed in claim 20 further comprising:
   the power supply, the flash lamps, the lasing rod set to fire laser output pulses from the lasing rod having an energy of greater than 1J, a rise time of about several hundred microseconds, and a pulse duration in a range of about a few hundred microseconds to 1 millisecond, and the Pockels cell set to sharpen the primary laser beam so that it has at least 1 Joule of energy.

27. An apparatus as claimed in claim 26 further comprising a dump path from the electro-optic switch to a dump and along which the energy is rejected away from the primary beam path.

28. An apparatus as claimed in claim 27 further comprising a delay generator controllably connected to the Pockels cell for triggering the Pockels cell.

29. An apparatus as claimed in claim 28 further comprising a fast photodiode operably disposed in the laser unit for measuring an initial laser output pulse from the laser oscillator and operably connected to the delay generator for triggering the delay generator to switch the Pockels cell.

30. An apparatus as claimed in claim 29 further comprising:

a beam splitter operably located after the electro-optic switch along the primary beam path for splitting the primary laser beam along two optical transmission circuits which include the one optical transmission circuit, the two optical transmission circuits operable for forming two stationary laser beams which include the one stationary laser beam, and the two optical transmission circuits further operable for the directing the stationary laser beams towards two laser shock peening target areas which include the one laser shock peening target area.

31. An apparatus as claimed in claim 30 further comprising a fluid nozzle directed towards each of the laser shock peening areas.

* * * * *